(12) United States Patent
Jaiprakash et al.

(10) Patent No.: US 6,486,675 B1
(45) Date of Patent: Nov. 26, 2002

(54) IN-SITU METHOD FOR MEASURING THE ENDPOINT OF A RESIST RECESS ETCH PROCESS

(75) Inventors: Venkatachalam C. Jaiprakash, Beacon, NY (US); Ulrich Mantz, Dresden (DE)

(73) Assignee: Infineon Technologies AG, Munich (DE)

( * ) Notice: Subject to any disclaimer, the term of this patent is extended or adjusted under 35 U.S.C. 154(b) by 25 days.

(21) Appl. No.: 09/676,871

(22) Filed: Sep. 29, 2000

(51) Int. Cl.[7] ................................................. G01R 31/11

(52) U.S. Cl. ........................... 324/533; 438/14; 438/16

(58) Field of Search ............................ 324/533; 438/14, 438/16, 243, 386, 783; 216/60.167; 134/1.1; 156/345; 118/725; 219/444.1

(56) References Cited

U.S. PATENT DOCUMENTS 6,124,141 A * 9/2000 Muller et al. .................. 438/14

* cited by examiner

Primary Examiner—N. Le
Assistant Examiner—Amy He
(74) Attorney, Agent, or Firm—Stanton Braden

(57) ABSTRACT

An in-situ method for measuring the endpoint of a resist recess etch process for DRAM trench cell capacitors to determine the buried plate depth on a semiconductor wafer thereof, including: placing an IR device on the etch chamber; illuminating the surface of a semiconductor wafer during etching to a resist recess depth with IR radiation from the IR device; detecting reflection spectra from the illuminated surface of the semiconductor wafer with an IR detector; performing a frequency analysis of the reflection spectra and providing a corresponding plurality of wave numbers in response thereto; and utilizing calculating device coupled to the IR detector to calculate the resist recess depth at the illuminated portion of the wafer from the plurality of wave numbers corresponding to the reflection spectra.

1 Claim, 2 Drawing Sheets

IN-SITU METHOD FOR MEASURING THE ENDPOINT OF A RESIST RECESS ETCH PROCESS

BACKGROUND OF THE INVENTION

1. Field of Invention

The invention relates to a system for and method to determine resist recess depth in-situ in trench cell DRAM capacitors, using FTIR (Fourier Transform Infrared Reflectometry) in combination with a fast photoconductive IR detector to determine an end point. The method is independent of ground rules and therefore extendible for ground rules smaller than 0.175 μm.

2. Description of Related Art

Good recess depth control for the resist recess in trench cell DRAM (Dynamic Range and Access Memory) capacitors requires a non-destructive in-situ depth measurement; however, there is no current method available which is extendible to ground rules for microelectronic sub devices smaller than about 0.175 μm.

U.S. Pat. No. 4,977,330 disclose an "in-line" photoresist thickness measuring device wherein a plurality of projection optical fibers are disposed over a wafer processing track for illuminating portions of a wafer as the wafer proceeds along the track. The spectrometer simultaneously diffuses the scattered light into a plurality of light bands, each light band having a different wavelength. The electrical signals generated by each pin diode in response to the incident light bands are communicated to a processor which calculates resist thickness for each illuminated portion of the wafer." "The software loads reflectivity data from the spectrometer into the computer's memory, and optionally subtracts a background spectrum from the data." (Col. 4, lines 35–37). "The spectrum data is converted into the frequency domain by a Fourier transform . . . Theoretical considerations reveal that the correct thickness will correspond to the largest value of the power spectrum of the Fourier transform." (Col.5, lines 9–26).

A method for "the spin development of a resist coating on the surface of a semiconductor wafer is monitored by measuring light scattered back from the wafer surface from an incandescent source in U.S. Pat. No. 4,647,172. During development, the sensed light level oscillates due to optical fringing caused by the thinning of the resist layer in the exposed areas and the fringe generated oscillation essentially stops when the development breaks through in the exposed areas." "[The] data stream representing the light scattered back from the wafer under development is compared with reference data representing a template characteristic of the optical fringes generated by a representative development process to determine a control point which characterizes a last fringe in the development process. The development process is then terminated a calculated time after the control point." (Col. 3, lines 25–33.)

A method for processing a layer of material while using in-situ monitoring and control is disclosed in U.S. Pat. No. 5,372,673. FIG. 17 disclose "a wafer which has a plasma enhanced oxide (PEO) portion, referred to as a dielectric portion and a photoresist portion. The wafer is positioned in a chamber of a semiconductor equipment system. The system is a batch etch system. Wafer 51 is a dummy etch monitoring wafer and other product wafers are positioned within the chamber adjacent the wafer 51 . . . A photoresist layer or a like layer which is similar or identical to the portion of 52 of wafer 51 is formed over the product wafers. This photoresist layer is formed over the layer of material and is used to achieve in-situ controlled etch-back planarization . . . . The laser beam reflection off of the surface of wafer 51 generates a sinusoidal interference pattern which can be used during etch processing to determine the etch rate of the portion 52 (i.e., the photoresist portion). The etch rate information is transmitted to the computer 60 via the conductor 63. The computer 60 uses the data received from the photodetectors 54a and 54b to alter the process conditions, process time, process environment, and/or process chemistry . . . " (Col. 11, line 40—Col. 12, line 16). "It should be understood that the dummy wafer 51 may also be a product wafer. The laser 58a may be positioned to monitor a first area of the product wafer, which is likely to expose the dielectric layer requiring planarization. The laser 58b may be positioned to monitor a second area of the product wafer which exposes predominantly photoresist. The same optimal planarization results via feedback control is achieved." (Col. 12, line 26–34).

U.S. Pat. No. 5,807,761 discloses a method for real-time in-situ monitoring of a trench formation process. "In the manufacturing of 16 Mbit DRAM chips, the deep trench formation process in a silicon wafer by plasma etching is a very critical step . . . A large area of the wafer is illuminated through a view port by a radiation of a specified wavelength at a normal angle of incidence. The reflected light is collected then applied to a spectrometer."

The resist recess process for DRAM trench cell capacitors determines the buried plate depth; however, there is a need for an end-point detection system for ground rules of microelectronic devices of 0.175 μm and smaller to control the recess etch process, which is extendible to ground rules smaller than 0.175 μm, and is therefore independent of ground rules.

SUMMARY OF THE INVENTION

One object of the present invention is to provide a method for determining recess depth control for the resist recess in trench cell DRAM capacitors in a non-destructive in-situ depth measurement.

Another object of the present invention is to provide a method for obtaining recess depth control for the resist recess in trench cell DRAM capacitors that is a non-destructive in-situ depth measurement which is extendible to ground rules of microelectronic devices smaller than 0.175 μm.

A further object of the present invention is to provide a method for recess depth control for the resist recess in trench cell DRAM capacitors that is a non-destructive in-situ depth measurement, that is extendible to ground rules smaller than 0.175 μm using FTIR reflectometry in combination with a fast photoconductive IR detector to measure resist recess depth in-situ during processing so that an end-point detection can be determined.

In general, the invention method for measuring the end point of the resist recess etch process and monitoring the etch rate is accomplished by placing an FTIR system on the etch chamber in tandem with utilizing IR light reflected from the processed wafer after the resist recess etch. The system used determines the resist recess depth for depth values >0.5 μm at any time, independent of the actual etch rate by reflection spectra from the wafer.

DESCRIPTION OF THE PREFERRED EMBODIMENTS

Present day integrated circuits, which include trench cell DRAM capacitors need good recess depth control for the resist recess in the trench DRAM cell capacitors, and requires a non-destructive in-situ depth measurement. However, there is no current method available which is extendible to ground rules smaller than about 0.175 µm.

Ground rules or geometrical design rules are a collection of geometrical constraints among geometrical shapes that define the layout of the integrated circuit.

Further, it is presumed that a circuit design which obeys the ground rules or geometrical design rules for a particular process should be manufacturable when using that process.

In the present invention, the method for measuring the endpoint of the resist recess etch process and monitoring the etch rate is accomplished by placing a FTIR system on the etch chamber and using it in combination with a fast photoconductive IR detector.

The resist recess process for DRAM trench cell capacitors determines the buried plate depth, and, at present, there is no endpoint detection system for ground rules of about 0.175 µm and smaller available to control the recess etch process.

Figure 1:
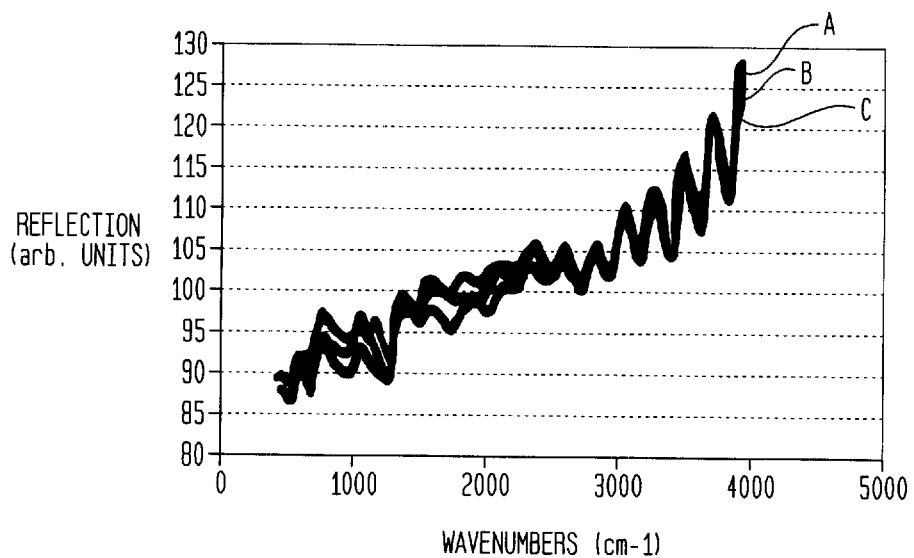
FIG. 1 is a graph showing IR reflection intensity of spectra as a function of wave numbers for three wafers after the resist recess etch of the invention process.

The device for measuring the endpoint of the resist recess etch process for DRAM trench cell capacitors to determine the buried plate depth on a semiconductor wafer, comprises:

An etch chamber means for etching a wafer;

IR ray illuminating means disposed on and in proximity to the etch chamber means for illuminating the surface of the etched wafer;

IR detector means disposed in proximity to the illuminated surface of the etched wafer for detecting reflection spectra from the illuminated surface of the etched wafer;

frequency analysis performing means in proximity to the reflection spectra for calculating a corresponding plurality of wave numbers in response to the reflection spectra; and calculating means coupled to the IR detector means, for calculating resist recess depth at the illuminated portion of the wafer from the plurality of waver numbers.

reference is now made to FIG. 1 which shows the infra red reflection intensity of spectra as a function of wave numbers for three wafers after the resist recess etch process of the invention. The method is able to determine the resist recess depth in-situ using FTIR reflectometry.

As can be seen from FIG. 1, the reflection spectra of three wafers A, B and C are shown after resist recess with different recess depths.

Figure 2:
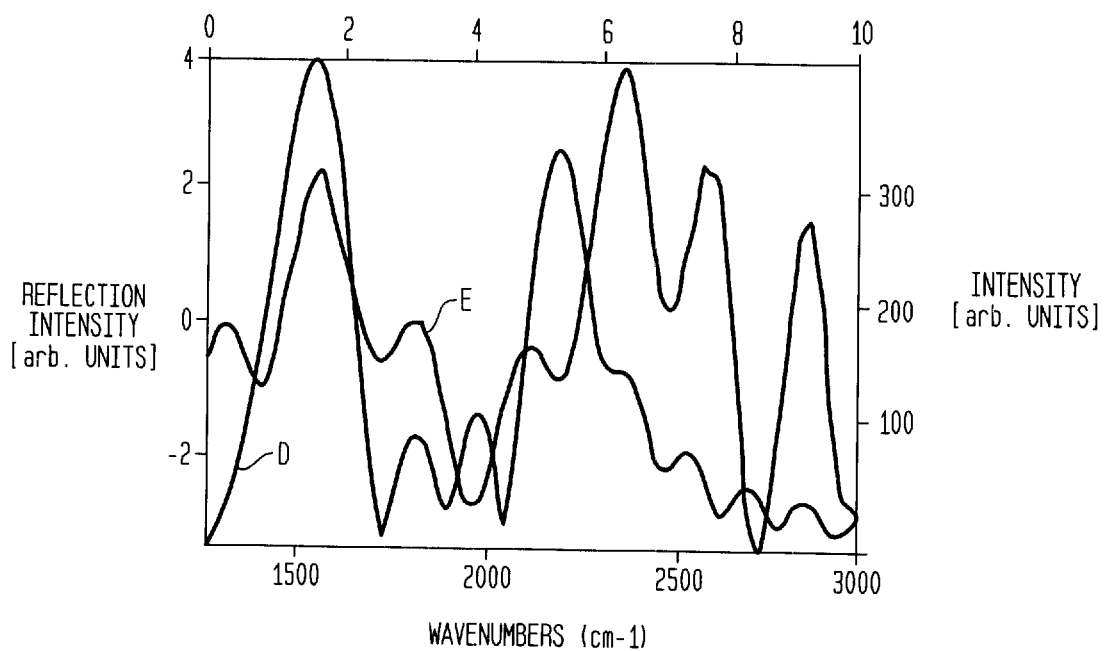
FIG. 2 is a graph showing a frequency analysis of the IR reflection spectra in combination with an appropriate algorithm for the background subtraction to determine resist recess depth from the IR reflection spectrum.

Determination of the recess depth is made by performing a frequency analysis of the IR reflection spectra in combination with an algorithm for background subtraction, as is shown in FIG. 2.

In operation, the in-situ method for measuring the endpoint of a resist recess etch process for DRAM trench cell capacitors to determine the buried plate depth on a semiconductor wafer, comprises: placing an FTIR device on the etch chamber; illuminating the surface of a semiconductor wafer during etching with IR radiation from the FTIR device; detecting reflection spectra from the illuminated surface of the semiconductor wafer with a photoconductive IR detector; performing a frequency analysis of the reflection spectra and providing a corresponding plurality of wave numbers in response thereto; and utilizing calculating means coupled to the photoconductive IR detector to calculate the resist recess depth at the illuminated portion of the wafer from the plurality of wave numbers corresponding to the reflection spectra.

In FIG. 2, calculations of the resist recess depth (line D) from the IR reflection spectrum (line E) is shown.

In order to measure the end point of the resist recess etch process and monitor the etch rate, an FTIR system is placed on the etch chamber. Thereafter, IR light is reflected from the processed wafer. For standard DRAM products, the spot size is not critical. The invention process is able to determine the resist recess depth for values >0.5 µm at any time, independent of the actual etch rate. Further, the invention process can also measure reprocessed wafers.

At a nominal etch rate of 50 nm/s the etch can be endpointed within 50 nm of the desired value. In addition, the depth values obtained for each measurement can be used to determine the etch rate at different resist recess depth.

The invention process is capable of constantly measuring the resist recess depth. Once a target depth value is either equal to or lower than the measured value, the etch process may be stopped.

Further, if desired, another algorithm for improved endpoint accuracy may be utilized to extrapolate techniques for the depth values.

Figure 3:
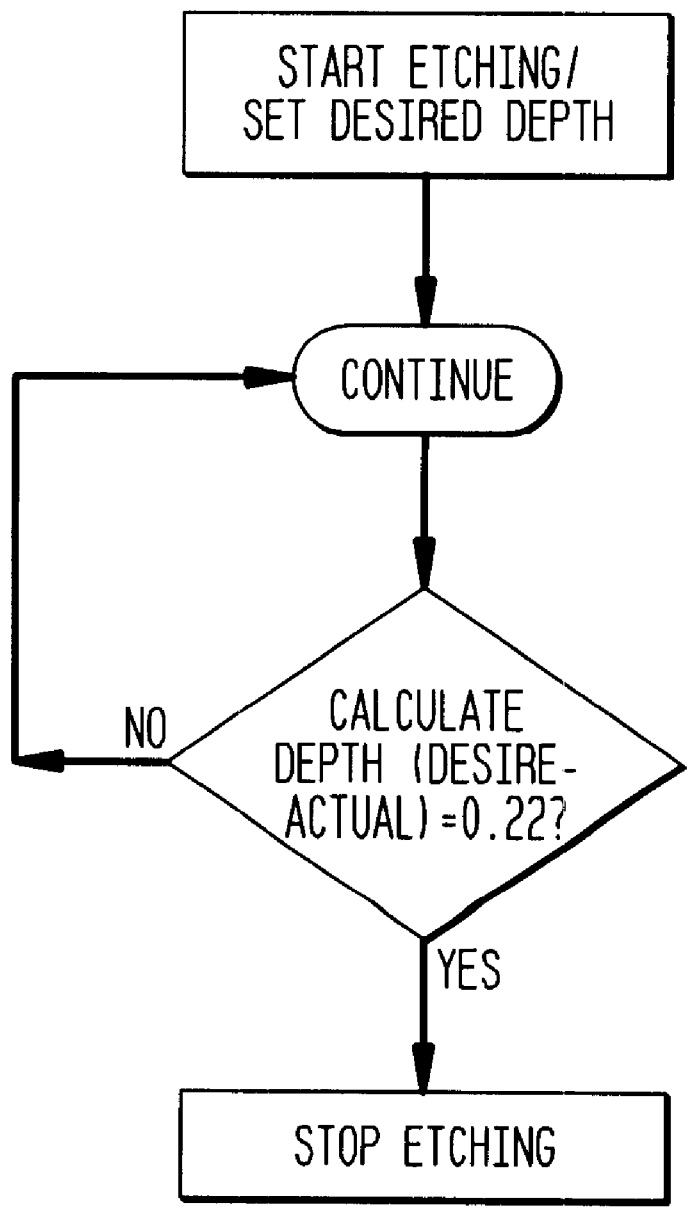
FIG. 3 is a flow chart which outlines the start etching-set desired depth and the intermediate processing steps necessary up to the point of stopping etching.

Reference is now made to FIG. 3, which is a flow chart that outlines the start etching/set desired depth as well as the intermediate processing steps necessary up to the point of stopping the etching process.

The process of the invention will provide better control of the resist recess etch process and also provide information about the dynamics of the etch process.

Further, as an additional factor, the final depth values may be used for quality insurance and process control and placed into SPC charts.

In the context of the invention process, while any IR radiating device may be utilized for placement on the etch chamber, an FTIR device is preferred. Similarly, while any IR detector may be used to detect reflection spectra, a fast photoconductive IR detector is preferred.

We claim:

1. An in-situ method for measuring the endpoint of a resist recess etch process for DRAM trench cell capacitors of ground rules of about 0.175 µm and smaller to determine the buried plate depth on a semiconductor wafer thereof, comprising:

a) placing a FTIR device on the etch chamber;
   b) illuminating the surface of a semiconductor wafer during etching to a resist recess depth with IR radiation from said FTIR device;
   c) detecting reflection spectra from the illuminated surface of said semiconductor wafer with a photoconductive IR detector;
   d) performing a frequency analysis of the reflection spectra and providing a corresponding plurality of wave numbers in response thereto; and
   e) utilizing calculating means coupled to the photoconductive IR detector to calculate the resist recess depth at the illuminated portion of the wafer from said plurality of wave numbers corresponding to said refection spectra.

* * * * *